Jan. 29, 1957 — T. A. HESS — 2,779,362
SAFETY LOCK FOR CUTTER HEAD OF JOINTER
Filed Feb. 15, 1955

INVENTOR.
Theophil A. Hess
BY
Attorney

United States Patent Office 2,779,362
Patented Jan. 29, 1957

2,779,362

SAFETY LOCK FOR CUTTER HEAD OF JOINTER

Theophil A. Hess, Island Lake, Ill., assignor to Duro Metal Products Co., Chicago, Ill., a corporation of Illinois Application February 15, 1955, Serial No. 488,201

5 Claims. (Cl. 144—114)

This invention relates to woodworking power tools and particularly to a safety lock for the cutter head of a jointer which is combined with, and forms a part of, a circular saw.

For convenience in use, and economy in initial cost and space occupied, it is desirable, wherever possible, to combine two or more tools in a single unit. With such an arrangement, one motor and one stand can be used to drive and support two or more tools, if they are properly related so that the work done by one of the tools necessarily, or conveniently, follows the work done by the other of the tools.

One combination of tools which has been found desirable is that of a power driven circular saw combined with a jointer. With this combination, the work may be cut or ripped by the saw, and the rough surface left by the saw can then be smoothed down by the jointer. The physical combination of these two tools, however, presents somewhat of a problem in the arrangement of the tables normally used with each. To use two separate tables, each of the size normally supplied with a circular saw and a jointer, would result in an over-sized table which would be cumbersome and would not make efficient use of the table area provided. A more efficient arrangement is to provide a table area adequate for one of the power tools and then to minimize the table area supplied with the other tool by utilizing at least a portion of the table area of the first power tool with the second.

Where the table of one power tool is used for supporting work operated upon by another power tool in accordance with the foregoing arrangement the tables of the two tools must necessarily be coplanar. If the tables of a combined circular saw and jointer are disposed in the same plane, however, there is a possibility that the blades of the jointer may protrude above the surface of the table when the saw is in use, and thus interfere with the movement of the work toward the saw and endanger the hands of the operator as well. It is accordingly an object of this invention to provide a combination circular saw and jointer having coplanar work supporting tables wherein means are provided for preventing the blades of the jointer from interfering with the movement of the work or from endangering the hands of the operator when the saw is in use.

As a more specific object, this invention seeks to provide a jointer, supplied with a cutter head having a plurality of substantially axially disposed blades, with means for locking the cutter head in a position relative to the table of the jointer wherein the cutters are disposed below the surface of the table and hence incapable of interfering with the movement of work on the table, or of causing injury to the operator.

A more specific object of this invention is to provide a latch means for holding the cutter head of a jointer in a predetermined position relative to the table thereof, said latch means utilizing as a part thereof the boss of the drive pulley for the cutter head in which is disposed the screw by which the pulley is secured to the drive shaft of the jointer.

Among the more general objects of this invention is the provision of a safety lock for the cutter head of a jointer which is simple to use, inexpensive to make and which when not in use can be readily and conveniently stored in an out-of-the-way place in readiness for use.

These and other objects of this invention will become apparent from the following detailed description when taken together with the accompanying drawings in which.

Figure 2:
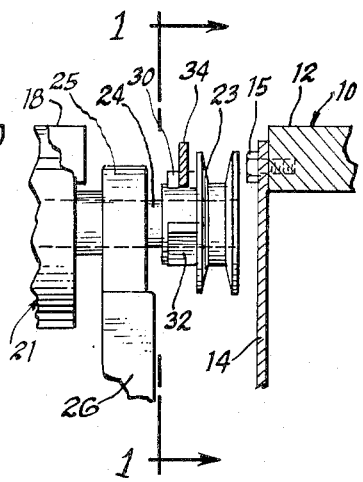
Fig. 2 is a fragmentary front elevational view in section of the jointer and saw of Fig. 1, the section being taken at, and in the direction of, the arrows 2—2 of Fig. 1.
Figure 3:
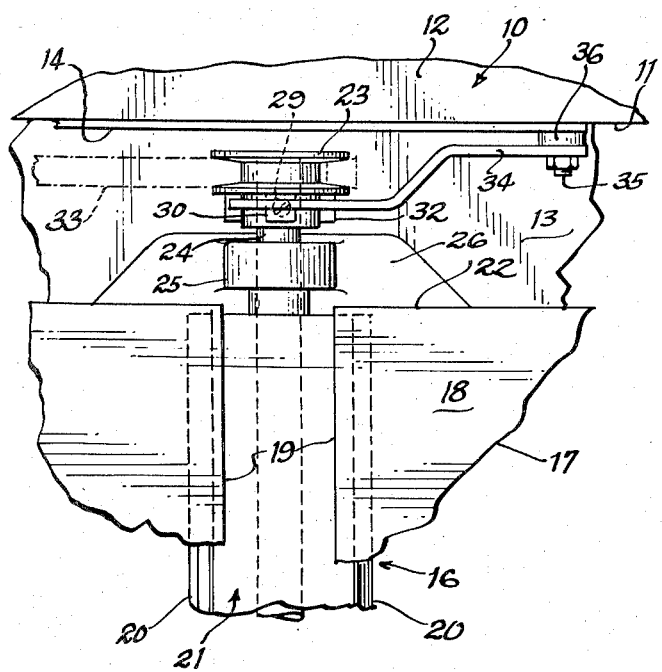
Fig. 3 is a fragmentary plan view of the jointer and saw showing the locking mechanism in operative position.
Figure 4:
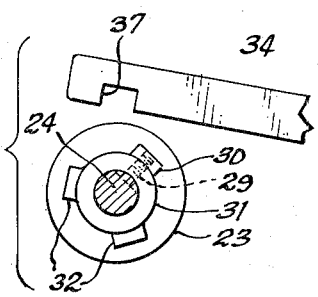
Fig. 4 shows the details of the locking mechanism in end elevation.

Referring now to the drawings for a detailed description of the embodiment selected to illustrate this invention, and particularly to Fig. 3 there is shown a table 10 which may be the work supporting table of a circular saw (not shown) or other wood working tool. The table and saw be of any of the well known designs and is preferably furnished with a motor (not shown) having one or more drive pulleys for the saw on one end of the shaft thereof, and a separate drive pulley on the other end of the shaft which may be used to drive an associated jointer. For convenience in describing this invention it will be assumed that side 11 of table 10 is the left side of the table, and that the front of the table therefore would be that portion disposed at the right of Fig. 3. The top surface 12 of table 10 is preferably a flat plane which is supported in a horizontal position upon an appropriate stand 13 by a framework of any suitable construction, and preferably provided with a cover plate 14 secured to the side of table 10 by bolts 15 (Fig. 2).

Mounted on stand 13, and spaced from the left side 11 of table 10, is a jointer 16 having a table 17 disposed with its top surface 18 in the same plane as top surface 12 of table 10 so that an article overhanging side 11 of table 10 and extending over table 17 may be supported by the surface 18 thereof without changing its angularity or position relative to surface 12. Table 17 has a slot 19 formed in surface 18 through which are adapted to extend the blades 20 of a rotatable cutter head 21. The right side 22 of table 17, that is, the side which faces side 11 of table 10, is spaced a short distance from side 11 to accommodate a pulley 23 by which the shaft 24 of cutter head 21 may be driven. A journal 25 provides a support for shaft 24, journal 25 being formed in the upper end of a frame member 26 for jointer 16 mounted on stand 13.

Figure 1:
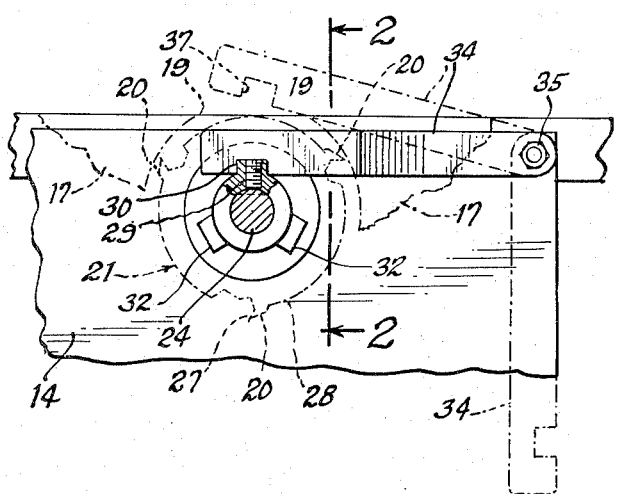
Fig. 1 is a fragmentary end elevation in section of a jointer and saw table to which the locking mechanism of this invention has been applied.

As shown in dotted outline in Fig. 1, cutter head 21 is so constructed as to support blades 20 with their cutting edges 27 extending beyond the outer surface 28 of the cutter head. Shaft 24 on which cutter head 21 is mounted, and with which it rotates, is so disposed relative to surface 18 of the jointer table that when blades 20 are rotated, they extend through slot 19 and above top surface 18 of table 17 to contact and finish work which may be disposed on surface 18. Outer surface 28, however, does not normally extend through slot 19 above the surface 18. The usual number of blades furnished with a cutter head is sufficiently small so that the angular distance between adjacent blades, using the axis of shaft 24 as a center, is greater than the angular distance represented by the edges of slot 19 at the intersection of such edges with surface 18. It is possible therefore to so dispose cutter head 21 angularly with respect to slot 19 that no blade 20, nor any part thereof, will extend above surface 18. Accordingly, when the jointer is not in use, if it can be held in a position wherein no part of any of its blades extends above surface 18, it will in no wise interfere with the movement of work being operated upon by the circular saw, and hence the juxtaposition of a jointer and a circular saw becomes entirely practical. Furthermore, by so proportioning the space between blades and the width of slot 19 as to cause blades 20 to be concealed by table 17, the possibility of injury to the operator by the blades while the operator is using the circular saw becomes nil.

Pulley 23 is secured to shaft 24 by a set screw 29 disposed in a boss 30 extending radially outwardly from the cylindrical surface of hub 31 of pulley 23. To balance the weight of boss 30, similar bosses 32 are formed 120° apart from boss 30. Pulley 23 and its bosses 30 and 32 are so assembled relative to shaft 24 and cutter head 21 that bosses 30 and 32 are disposed angularly midway between adjacent blades 20. Thus, as shown in Fig. 1, when the axis of set screw 29 is vertical, cutter blades 20 are disposed below surface 18 and are safely out of the way.

It is contemplated that when the jointer is not in use drive belt 33 (shown dotted in Fig. 3) will be disconnected from the drive motor leaving cutter head 21 free to rotate, and hence means must be provided for insuring the fixed location of the cutter head 21 in the position shown in Fig. 1. In accordance with this invention, such means is comprised of a latch bar 34 supported at one end for free rotation about a stud 35 secured to table 10, the bar being spaced from the intervening cover plate 14 by a washer 36. The free end of bar 34 is offset and is formed with a square notch 37 adapted to fit over boss 30. Thus, when boss 30 is retained in square notch 37, pulley 23 and its associated shaft 24 and cutter head 21 are all held against rotation, and with boss 30 angularly related to cutters 20 in the manner shown in Fig. 1, the blades will be held away from surfaces 18 and 12.

It may be observed that latch bar 34 is so supported that its own weight will tend to hold it over boss 30. No locking means therefore is necessary to hold latch bar 34 in place, and the bar can be put into use very readily and quickly. The dimensions of latch bar 34, particularly its vertical dimension when disposed as shown in solid lines in Fig. 1, are such that no part of the bar extends above either surface 12 or 18 when it is in use.

When latch bar 34 is not in use it is rotated clockwise as viewed in Fig. 1 and allowed to hang freely in the space between tables 10 and 17. In this location it is out of the way, not only with reference to work which may be disposed upon surfaces 12 and 18, but also with reference to pulley 23 and belt 33 which may be rotating at high speeds. When it is desired again to hold pulley 23 in the position shown in Fig. 1, latch bar 34 is rotated counterclockwise as viewed in Fig. 1 and dropped over boss 30, with the boss received within square notch 37, belt 33, of course, having been previously disconnected from its drive motor.

It may be apparent that the safety locking mechanism hereinabove described is extremely simple both in operation and in construction. It requires no additional parts either on pulley 23 or on the remainder of the jointer, and since boss 30 is already present, it can be made to perform a dual function.

It is understood that the foregoing description is merely illustrative of a preferred embodiment of this invention and that the scope of the invention therefore is not to be limited thereto but is to be determined by the appended claims.

I claim:

1. In combination, a rotatable cutting tool comprising a head, a blade secured thereto, a shaft on which the head is mounted for rotation therewith, a rotatable driving member mounted on and adapted to drive said shaft, said rotatable driving member having a radially extending boss, means cooperating with the boss for securing the member to the shaft, a frame for supporting the tool, and means adapted to connect the boss to the frame and hold the boss and its associated shaft and blade in a fixed angular relationship to the frame.

2. A combination as described in claim 1, said means being adapted to connect the boss to the frame comprising a lever pivoted to the frame at one end and having a notch at its other end adapted to receive the boss.

3. A combination as described in claim 1, said means adapted to connect the boss to the frame comprising a lever pivoted to the frame at one end and having a notch at its other end adapted to receive the boss, said pivot for the lever being laterally offset from the boss and disposed to swing the lever in a vertical plane whereby said lever is held in its boss-engaging position by gravity.

4. In a combined tool having a sawing station, a work supporting table therefor, a planing station and a work supporting table for the planing station, said tables being spaced apart and having coplanar upper surfaces, a cutter head for the planing station comprising a shaft disposed below the upper surface of the planing table and rotatable about an axis parallel with the plane of the upper surface, a blade-holding head mounted on the shaft and rotatable therewith, a blade secured to the head with its cutting edge disposed substantially parallel to the axis of the shaft and extending radially outwardly from the adjacent surface of the head, said planing station table having an opening therein in proximity to the head, said shaft being disposed from the planing station table upper surface a distance such that the cutting edge of the blade is adapted to extend through the opening above the said planing station table upper surface while the head is disposed below said upper surface, means for driving the shaft, and means cooperable with the drive means for locking the head with said blade disposed below the said planing station table upper surface.

5. In combination, a rotatable cutting tool comprising a head, a blade secured thereto, a shaft on which the head is mounted for rotation therewith, a drive pulley mounted on said shaft, said pulley having a hub and a radially extending flat-sided boss, a set screw in the boss for securing the hub and pulley to the shaft, a frame for supporting the tool, a second tool supported from the frame, coplanar work supporting surfaces adjacent each tool, said surfaces being spaced from one another, said pulley being disposed in the space between the work supporting surfaces, the surface adjacent the first-mentioned tool being slotted and the blade being adapted to project through the slot above the said slotted surface, and means in said space adapted to connect the boss to the frame, said means comprising a lever pivoted to the frame at one end and having a notch at its other end adapted to receive the boss, the pivot for the lever being laterally offset from the boss and disposed to swing the lever in a vertical plane whereby the lever is held in its boss-engaging position by gravity.

References Cited in the file of this patent

UNITED STATES PATENTS 1,089,654    Loveland _____ Mar. 10, 1914
1,093,456    Mitchell _____ Apr. 14, 1914